United States Patent

Lin

[11] Patent Number: 6,152,540
[45] Date of Patent: Nov. 28, 2000

[54] GOLF TROLLEY WHEEL CONNECTION ASSEMBLY

[75] Inventor: Fang-Shen Lin, Tainan Hsien, Taiwan

[73] Assignee: Forever Young Enterprise Co., Ltd., Taipei, Taiwan

[21] Appl. No.: 09/387,936

[22] Filed: Sep. 1, 1999

[51] Int. Cl.⁷ ............................... B60B 23/00; B62B 1/00
[52] U.S. Cl. ..................... 301/111; 301/120; 280/DIG. 6
[58] Field of Search .................... 301/111, 112, 301/113, 131, 120, 121, 122, 119; 280/DIG. 6, 642, 645, 647, 652, 654

[56] References Cited

U.S. PATENT DOCUMENTS

| | | | |
|---|---|---|---|
| 5,507,566 | 4/1996 | Chen | 301/121 |
| 5,529,385 | 6/1996 | Tsao | 301/111 |
| 5,997,105 | 12/1999 | Wu | 301/124.1 |
| 6,003,956 | 12/1999 | Wu | 301/120 |
| 6,048,037 | 4/2000 | Cheng | 301/111 |
| 6,056,369 | 5/2000 | Lin | 301/111 |

FOREIGN PATENT DOCUMENTS

| | | | |
|---|---|---|---|
| 508902 | 10/1992 | European Pat. Off. | 301/111 |
| 553027 | 1/1923 | France | 301/120 |
| 271024 | 1/1930 | Italy | 301/111 |
| 151067 | 1/1920 | United Kingdom | 301/120 |
| 2238277 | 5/1991 | United Kingdom | 301/111 |

*Primary Examiner*—Russell D. Stormer
*Assistant Examiner*—Long Bao Nguyen
*Attorney, Agent, or Firm*—Alan Kamrath; Oppenheimer Wolff & Donnelly LLP

[57] ABSTRACT

A golf trolley has a wheel device, a wheel support frame, and a golf trolley wheel connection assembly disposed between the wheel device and the wheel support frame. The golf trolley wheel connection assembly has a fixed seat, a pressing block, a spring, and a blocking seat. The fixed seat has a sleeve, a shaft hole, and a through hole. The pressing block has a head, a bevel, and two legs. Each leg has a blocking end. The blocking seat has two arms and a through aperture. The pressing block is inserted in the sleeve. The spring is disposed between the legs. A rivet passes through the through hole and the through aperture.

1 Claim, 4 Drawing Sheets

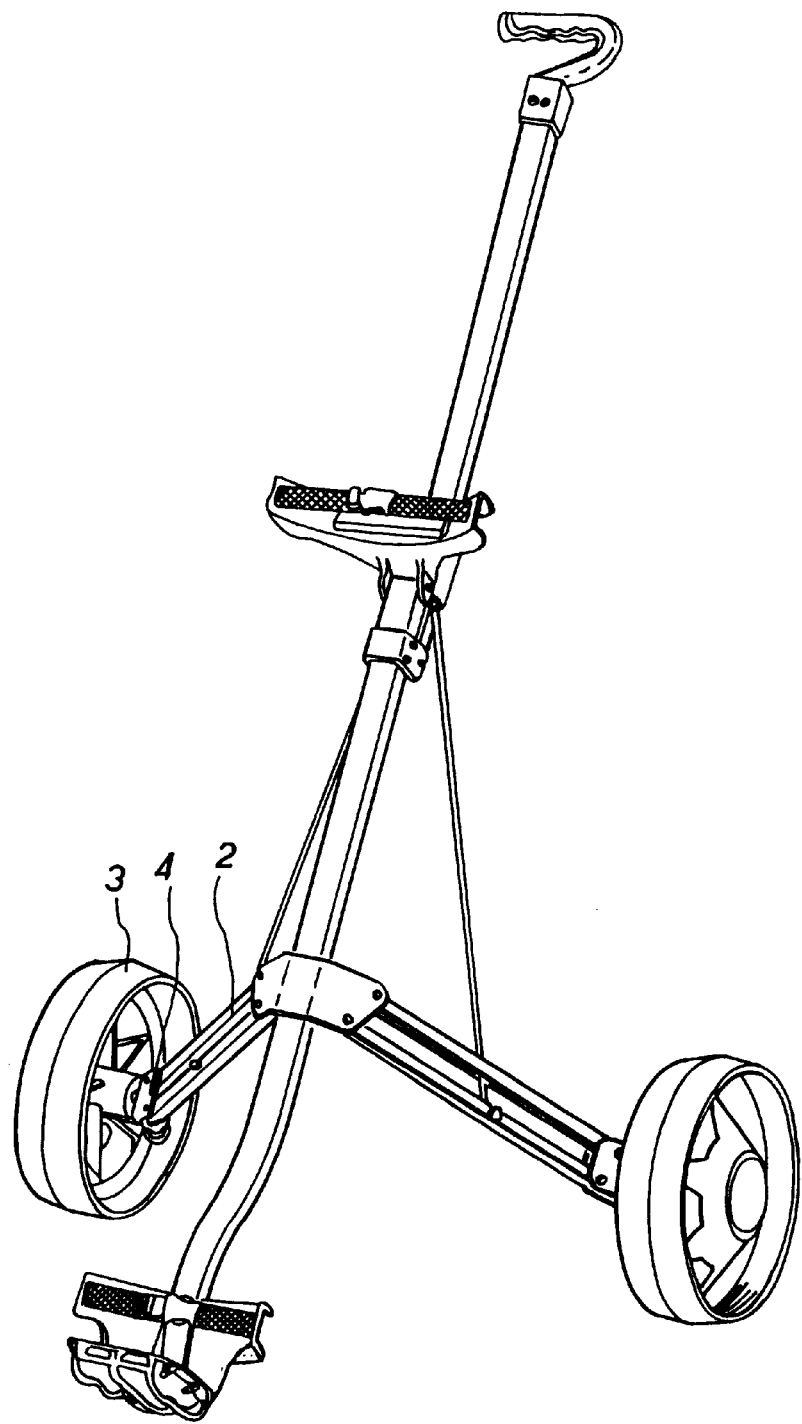
F I G. 1

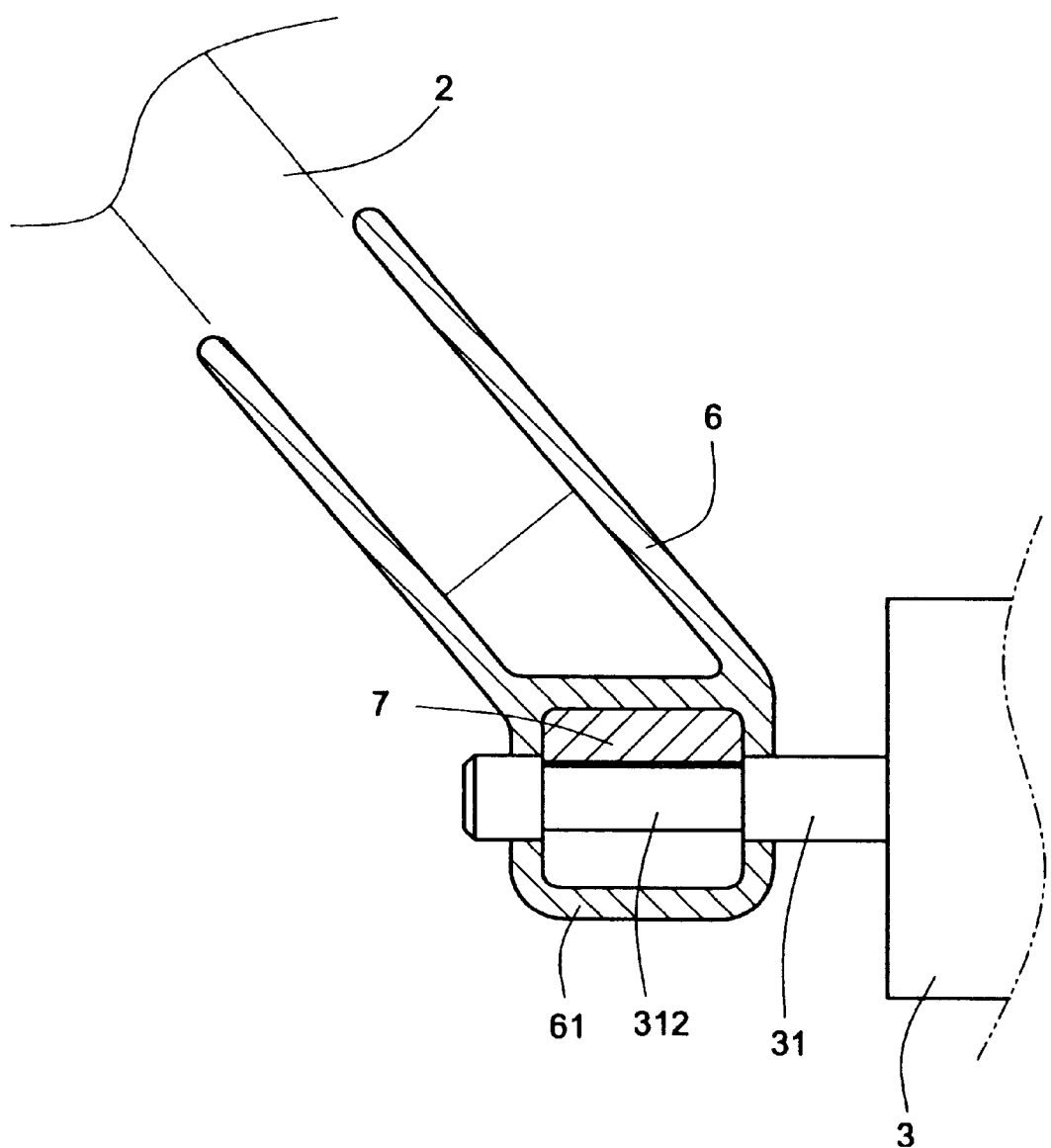
F I G. 3

GOLF TROLLEY WHEEL CONNECTION ASSEMBLY

BACKGROUND OF THE INVENTION

The invention relates to a golf trolley. More particularly, the invention relates to a golf trolley wheel connection assembly.

In general, a conventional golf trolley wheel connection device has a lot of elements. It is very difficult to assemble a lot of elements of the conventional golf trolley wheel connection device.

SUMMARY OF THE INVENTION

An object of the present invention is to provide a golf trolley wheel connection assembly which is easily assembled.

Accordingly, a golf trolley comprises a wheel device, a wheel support frame, and a golf trolley wheel connection assembly disposed between the wheel device and the wheel support frame. The wheel device has a shaft. An annular recess is formed on the shaft. The golf trolley wheel connection assembly has a fixed seat, a pressing block, a spring, and a blocking seat. The fixed seat has a sleeve, a shaft hole, and a through hole. The pressing block has a head, a bevel, and two legs. Each of the legs has a blocking end. The blocking seat has two arms and a through aperture. The pressing block is inserted in the sleeve. The spring is disposed between the legs. A rivet passes through the through hole of the fixed seat and the through aperture of the blocking seat. The shaft is inserted through the shaft hole of the fixed seat while the head of the pressing block is pressed inward.

BRIEF DESCRIPTION OF THE DRAWINGS

FIG. 1 is a perspective view of a golf trolley of a preferred embodiment in accordance with the invention;

FIG. 3 is a sectional assembly view of a golf trolley wheel connection assembly of a preferred embodiment in accordance with the invention;

DETAILED DESCRIPTION OF THE INVENTION

Figure 2:
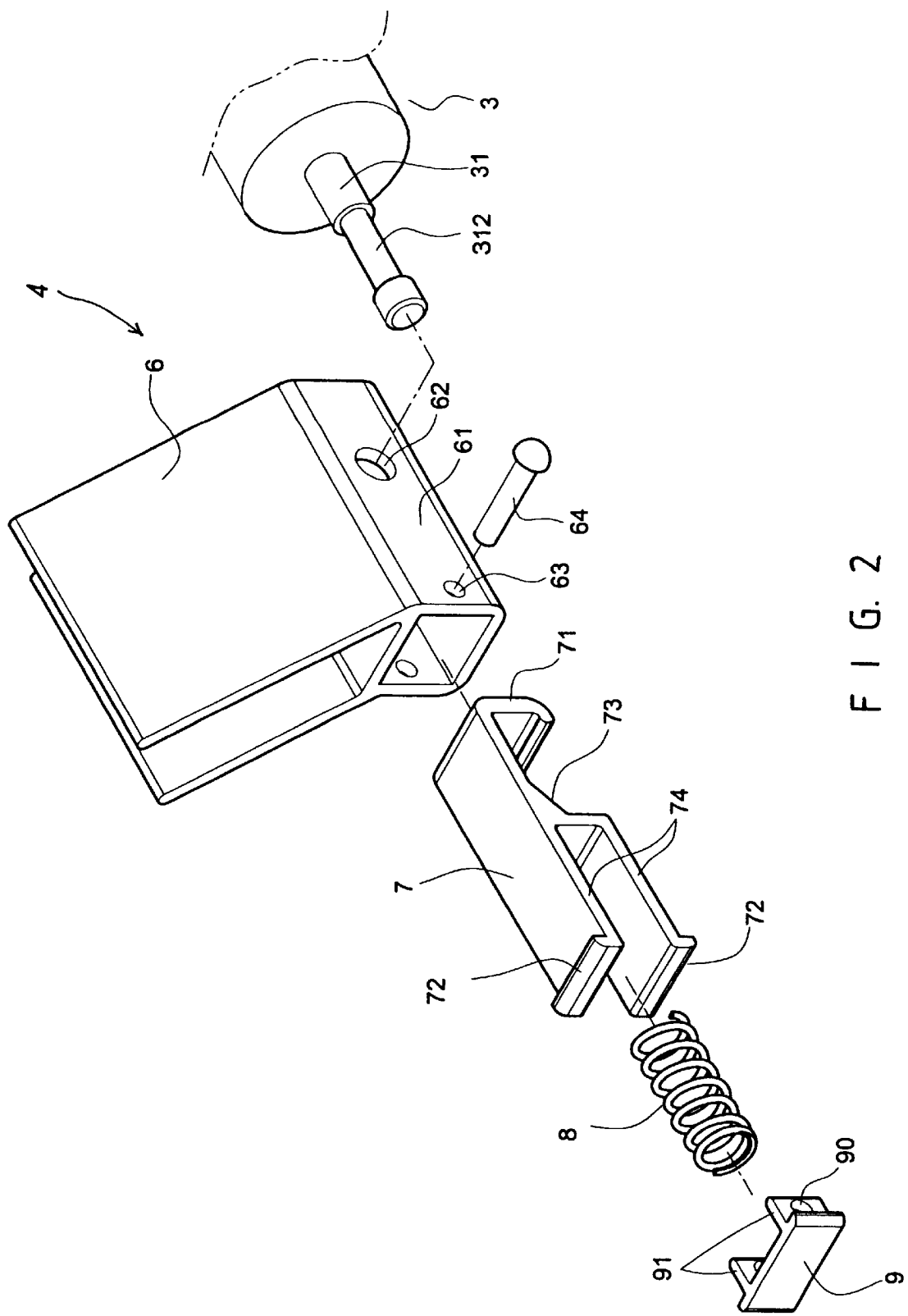
FIG. 2 is a perspective exploded view of a golf trolley wheel connection assembly of a preferred embodiment in accordance with the invention.

Referring to FIGS. 1 to 5, a golf trolley comprises a wheel device 3, a wheel support frame 2, and a golf trolley wheel connection assembly 4 disposed between the wheel device 3 and the wheel support frame 2.

The wheel device 3 has a shaft 31. An annular recess 312 is formed on the shaft 31.

The golf trolley wheel connection assembly 4 has a fixed seat 6, a pressing block 7, a spring 8, and a blocking seat 9.

The fixed seat 6 has a sleeve 61, a shaft hole 62, and a through hole 63.

The pressing block 7 has a head 71, a bevel 73, and two legs 74. Each of the legs 74 has a blocking end 72.

The blocking seat 9 has two arms 91 and a through aperture 90.

The pressing block 7 is inserted in the sleeve 61. The spring 8 is disposed between the legs 74. A rivet 64 passes through the through hole 63 of the fixed seat 6 and the through aperture 90 of the blocking seat 9.

The shaft 31 is inserted through the shaft hole 62 of the fixed seat 6.

Figure 5:
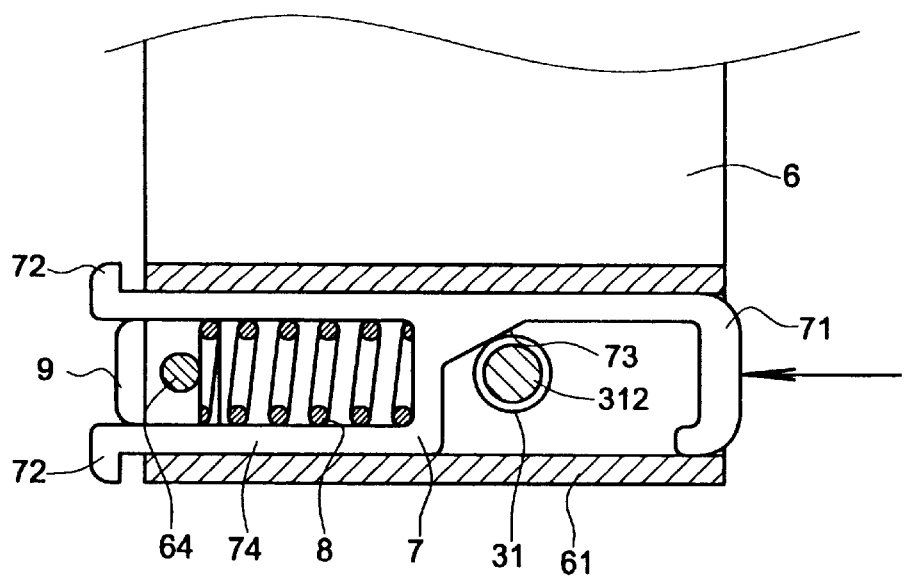
FIG. 5 is a sectional schematic view of a golf trolley wheel connection assembly of a preferred embodiment while a pressing block is pressed.

Referring to FIG. 5, the head 71 of the pressing block 7 is pressed inward. Then the shaft 31 is inserted through the shaft hole 62 of the fixed seat 6.

Figure 4:
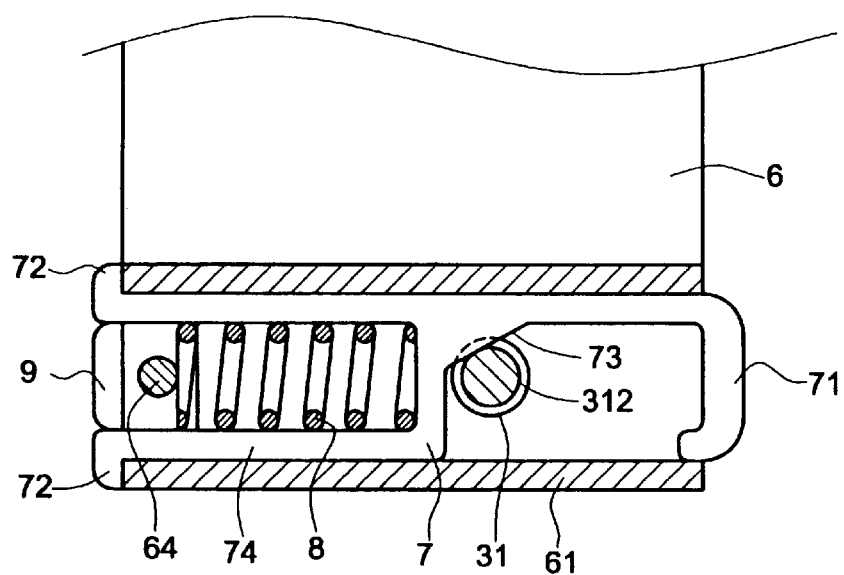
FIG. 4 is a sectional schematic view of a golf trolley wheel connection assembly of a preferred embodiment while a pressing block is not pressed.

Referring to FIG. 4, the head 71 of the pressing block 7 is released. Then the spring 8 pushes the pressing block 7 until the bevel 73 is inserted in the annular recess 312 of the shaft 31. Therefore, the golf trolley wheel connection assembly is easily operated.

Since the present invention provides a golf trolley wheel connection assembly with few elements, the golf trolley wheel connection assembly is easily assembled.

The present invention is not limited to the above embodiment but various modification thereof may be made. Furthermore, various changes in form and detail may be made without departing from the scope of the present invention.

I claim:

1. A golf trolley comprising:

a wheel device, a wheel support frame, and a golf trolley wheel connection assembly disposed between the wheel device and the wheel support frame, the wheel device having a shaft, an annular recess formed on the shaft, the golf trolley wheel connection assembly having a fixed seat, a pressing block, a spring, and a blocking seat, the fixed seat having a sleeve, a shaft hole, and a through hole, the pressing block having a head, a bevel, and two legs, each of the legs having a blocking end, the blocking seat having two arms and a through aperture, the pressing block inserted in the sleeve, the spring disposed between the legs, a rivet passing through the through hole of the fixed seat and the through aperture of the blocking seat, and the shaft inserted through the shaft hole of the fixed seat while the head of the pressing block is pressed inward whereby said bevel on said pressing block engages said annular recess on said shaft to prevent said shaft from being removed from said shaft hole.

* * * * *